106. COMPOSITIONS, COATING OR PLASTIC.

Patented Aug. 2, 1938

2,125,281

UNITED STATES PATENT OFFICE 2,125,281

MANUFACTURE OF CEMENTITIOUS MATERIALS

John A. Blank, Ironton, Ohio, and Alton J. Blank, Puebla, Mexico, assignors to Cement Process Corporation, a corporation of Delaware No Drawing. Application November 23, 1932, Serial No. 644,085

6 Claims. (Cl. 106—25)

This invention relates to the manufacture of cementitious materials, and more particularly to a new process whereby such materials may be produced at a relatively low cost as compared with the present processes and with strength and other physical properties adjusted as desired in order to meet any one of a wide variety of industrial applications. The invention also includes the new cementitious products that may be produced by the process.

The processes heretofore commonly employed for preparing hydraulic cements of the types known as Portland cement and super cement have included as an essential step the calcination to incipient fusion of an intimate and properly proportioned mixture of calcareous and argillaceous materials. This operation involves a large initial outlay for kilns and related apparatus and a continuing relatively high cost for repairs and maintenance of the apparatus employed. In addition, there are substantial operating costs for fuel and power. The product of the calcination treatment must be re-ground, thus further adding to the cost of manufacture.

The calcination treatment above mentioned has been regarded as essential in order to bring about such chemical combinations between the lime constituent and the siliceous and aluminous components of the argillaceous material as will insure to the product the hydrating, strength and setting properties desired in a hydraulic cement of either of the types above mentioned. As disclosed in his co-pending Patent No. 1,912,883, dated June 11, 1933, Alton J. Blank, one of the inventors named herein, has discovered that when lime in a form reactive to silica and alumina and in a fine state of subdivision is brought into intimate contact with finely divided siliceous material, or with an argillaceous material of any one of the types heretofore considered as useful in Portland cement manufacture, under controlled low temperature conditions and in the presence of water or water vapor, the lime will enter into chemical combination with the siliceous components as well as the aluminous components, if any, of the siliceous or argillaceous material used. As pointed out further in the above-mentioned patent, by suitable control of the duration of the treatment, the temperature and the kinds and proportions of the calcareous and siliceous or argillaceous materials used, and, in some cases, by further additions of other cementitious materials, e. g., varying amounts of Portland cement or Portland cement clinker, and/or by additions calculated to accelerate the desired reactions or otherwise beneficially affect the product, the product resulting from the process may be on the one hand similar in composition and have physical properties equal to and in some cases far exceeding those possessed by the best grades of Portland cement, the so-called super cements and other high-grade hydraulic cements now available. On the other hand, a product having properties which make it particularly adaptable for use as a mortar or as a relatively low-grade cement may be produced.

The present invention has for an object an improvement upon the process of the aforesaid patent whereby still better results are obtained with given kinds and proportions of materials and whereby it is made possible to utilize more effectively certain of the available raw materials.

More particularly, we have found that by carrying out the calcination of the limestone or other calcareous material in the presence of siliceous or of argillaceous materials and with intermingling and agitation of the materials in admixture during the calcination, certain chemical combinations between the lime and the aluminous and siliceous components present may be effected, and that these combinations appear to aid in carrying forward the further combinations that are aimed to be effected in the subsequent treatment according to the process of the aforesaid patent. We have also found that even those siliceous and argillaceous materials that ordinarily are relatively inert and slow to react with lime when subjected to agitation and grinding with hydrated lime in the presence of moisture at the temperatures recommended in carrying out the process of the aforesaid patent, are rendered much more reactive and enter readily into chemical combinations with lime such that when the product is applied to industrial uses it is found to be susceptible of the hydration and setting reactions characteristic of Portland cement and other hydraulic cements.

The invention has the same advantages as respects lower operating temperatures and consequent lower operating cost as the process of the aforesaid patent in comparison with the heretofore commonly employed high temperature calcination process of manufacturing Portland cement which involves incipient fusion of the materials. Satisfactory results are obtained when the calcination step of the present process is carried out at ordinary lime burning temperatures. However, operation at somewhat higher temperatures is not excluded and in some instances may be found desirable, as is pointed out further hereinafter.

As in the process of the aforesaid patent, the invention in certain of its embodiments involves the addition of varying proportions of Portland cement to the materials undergoing treatment. Furthermore, the addition of Portland cement clinker at an intermediate stage and the controlled grinding thereof with the products of the calcination treatment either before or after the hydration of the free lime component of such products is within the scope of the invention.

The practice of the invention will be illustrated in more detail below:

According to one embodiment of the process, limestone is crushed to, say, 1½″. The material is screened and the fines passing a ¼″ screen are ground with a suitable siliceous or argillaceous material. The proportions of screenings and siliceous or argillaceous material ground together at this stage are preferably so adjusted as to form a mixture of lime-silica proportions such as are possessed by ordinary Portland cement, but may be varied if desired. The resulting mix is then fed with the coarse limestone to and through a rotary kiln operated at a temperature calculated to insure complete calcination of the limestone, from about 800° C. to around 1,200° C. As will been seen, a certain proportion of the burn is a cement mix composition. This proportion may be regulated to suit the product it is desired to make. The burn is then put through a hammer mill or otherwise suitably ground to, say, minus 10 mesh. A further amount of siliceous or argillaceous material is added either as the materials are fed to the hammer mill or intermediate the hammer mill and the next or hydrating stage of the operation, the amount of material so added being regulated to produce a final mix of the desired composition. The whole is then subjected to a hydrating treatment and then further ground together, either with or without the addition of Portland cement, in the presence of a small amount of water and at a temperature sufficient to produce reactions between the lime and the siliceous, or siliceous and aluminous, components of the mixture of the general nature of those produced in the similar step of Patent No. 1,912,883. For the production of products having the strength and setting properties as well as other physical characteristics of Portland cement and high early strength cements, an operating temperature of 100° C. and upwards in this moist mixing or grinding step seems to be required in order to promote and carry forward to the desired degree the necessary reactions. However, with careful selection of the materials employed and suitable control of the operation, particularly as respects sub-division of the materials and the nature and extent of grinding and mixing, beneficial results are obtainable operating at still lower temperatures, at least to the extent that high-grade masonry cements and other hydraulic cements of varying strength and setting properties up to and equalling those of ordinary Portland cement may be produced.

Another method of practicing the process is illustrated below:

A test run was made with the argillaceous component consisting of river sand derived from rock of volcanic origin and of low fusion point. A mixture of the river sand and limestone in the proportions of one part of river sand to two parts of lime (CaO) was burned in a rotary kiln operated at about 1,200° C. The limestone had been crushed before burning until all pieces were less than 2½ inches in their greatest dimension, and the sand was all fine enough to pass a sieve having 4 meshes per linear inch. The calcined mixture was ground in a hammer mill until all passed a 10-mesh sieve and then was fed to a hydrator. The hydrated product was then fed to and through a tube mill in admixture with varying amounts of Portland cement. A sample product containing no Portland cement addition was also obtained. The materials in the tube mill were subjected to a grinding and mixing action in accordance with normal grinding practice, except that the temperature was controlled so as to insure a temperature in the exiting product of at least 100° C. and sufficient water was added to insure that the grinding was carried out continuously in the presence of moisture. At the same time not enough water was present to produce wet grinding conditions. The materials were reduced in the tube mill to a fineness such that more than 90% of the product exiting from the tube mill passed a 200-mesh sieve. Owing to the low fusion point of the sand a certain amount of vitrified product was produced in the calcination step, and this may have to some extent adversely affected the test results. However, despite this, the resulting products proved to have interesting properties. We set forth below the tensile strength values and setting times of the several products together with percentage comparisons of the same with representative Portland cement and super cement compositions.

| Percent cement in test sample | Tensile strength values in lbs. per sq. inch (1:3 sand) | | | Comparison in percent with representative cements | | Setting time (hours and minutes) | |
|---|---|---|---|---|---|---|---|
| | 24 hrs. | 3 days | 7 days | Normal Portland cement | Super cement | Initial | Final |
| 100 | 235 | 341 | 406 | 100 | ......... | 2:00 | 4:20 |
| 95.5 | 401 | 452 | 597 | 148.1 | 121.8 | 1:15 | 3:00 |
| 63.7 | 356 | 372 | 487 | 123.7 | 101.7 | 1:10 | 3:00 |
| 29.1 | 174 | 233 | 374 | 79.5 | 65.3 | 1:30 | 3:30 |
| 6.3 | 44 | 52 | 116 | 21.5 | 17.7 | 3:35 | 12:15 |
| 3.1 | 41 | 48 | 90 | 18.2 | 15.0 | 4:00 | 13:15 |
| 0 | 32 | ----- | 37 | 7.0 | 5.8 | 4:30 | 13:40 |

It will be observed from the above that the product containing about 95% of Portland cement shows strength values approximating 48% greater than a normal Portland cement and over 20% greater than a representative super cement. Further, it will be observed that products having satisfactory setting properties and high early strengths equal to and exceeding those of super cement are indicated when the Portland cement addition equals or exceeds about 60% of the final product. When it is considered that the manufacturing cost of our product, even with a large addition of Portland cement, is lower than that of a Portland cement made according to the commonly employed high temperature calcination process, its attractiveness from the economic standpoint becomes apparent. When it is considered further that a product may be produced at less cost than ordinary Portland cement while at the same time possessing properties equal or superior to those of super cements, which heretofore have cost much more to manufacture than ordinary Portland cement, the economic differential in favor of our process is still further emphasized. It is further indicated by the results above noted that products having properties equal or superior to those of ordinary Portland cement may be produced when the Portland cement addition is varied from around 45 to 60%. By more careful selection of the siliceous or argillaceous materials employed, it is possible to produce a product the equivalent of Portland cement with additions of Portland cement of around 30% and even lower. Similarly, by using finer ground Portland cement, or resorting to finer grinding in the tube mill grinding step, the proportion of Portland cement may be reduced.

In addition to the products of the order of Portland and super cements, products having plasticity and spreading qualities adapting them for use as high-grade masonry cements for use in brick laying on for stuccoing or plastering may be produced at a relatively low cost. In this connection, it has been observed that the products produced either without any Portland cement addition or with small additions, say, less than 10%, show strikingly high increases in strength in the period from 7 to 28 days. In other words, the masonry cements possessing either low or normal strengths at the end of 7 days show strengths at the end of 28 days far superior to those possessed by the masonry cements now commonly available and having similar strength properties at the end of 7 days. In the specific tests hereinbefore described, the products having additions of 6.3% and 3.1% of Portland cement possessed plasticity and setting properties comparable to those of high-grade masonry cements, while the product containing no Portland cement was classifiable as a fair masonry cement.

In further explanation of the strength values and the setting times observed, we would point out that the tests were all carried out in accordance with American standard methods for testing Portland cement. This involved for the strength tests holding the test samples in air for 24 hours and then immersion in water for the other periods. It will be understood that this method would not be productive of such high strength values for the masonry cement compositions as would have been the case if such samples had been tested under the standard conditions laid down for testing masonry cements. For the purpose of better evaluating the test products that showed promise as masonry cements, a series of strength tests was run wherein the test samples were stored for one day in the air and then for 3, 7, and, in some cases, 28 days in moist air, i. e., they were disposed in a closet above a pan of water so as to insure humid conditions. We set forth below the results of the tests to and including the 7-day test:

| Per cent. cement in test sample | Tensile strength values in lbs. per sq. inch (1:3 sand) | | |
|---|---|---|---|
| | 1 day | 3 days | 7 days |
| 6.3 | 44 | 64 | 136 |
| 3.1 | 41 | 79 | 167 |
| 0 | 32 | 55 | 113 |

In the test runs referred to herein, the tube mill employed was of standard type having an internal diameter of 5 feet and a length of 22 feet, and provided with grinding media consisting of cylindrical metal slugs of about 5/8" diameter and 1½" in length. It will be understood that other forms of grinding and mixing apparatus may be employed which will insure a similar degree of grinding and mixing.

The present invention has the advantage that the siliceous or argillaceous materials may be selected from a very wide range of the types of such materials available. Materials that react relatively slowly with the calcareous constituent or that are otherwise poorly suited for use in the process of Patent No. 1,912,882 are rendered amenable to treatment according to the process in the line calcination step, and also appear to enter in the course of the calcination at least partially into certain combinations with the lime constituent, so that in the later stages of the operation the desired combinations are effected to a degree unobtainable by the mere application of the prior process alone. Aside from the fact that a certain degree of chemical combination between the lime and the siliceous or argillaceous materials is aimed at and attained in the calcination operation, a further beneficial result that may be obtained by the calcination is the breaking down of the crystalline or other physical structure of the siliceous or argillaceous material or otherwise rendering the siliceous, or siliceous and aluminous, components thereof more reactive with lime. This is a feature that is of particular importance where relatively inert crystalline siliceous materials are used, such as certain quartz sands, granites and the like.

While, as above stated, a wide variety of siliceous and argillaceous materials may be employed, it is recommended when products having high early strength and other superior physical properties are desired, that materials be used which in their natural state or after a small amount of grinding, either prior to or in the course of the operation, are reduced to an extremely fine state of subdivision. Materials possessing this physical characteristic and that are particularly suitable for the present purpose are tripoli and diatomaceous earth. These materials reduce easily to a fineness of at least 90% through a 200-mesh screen. When other siliceous materials, such for example as sand, or materials of an argillaceous nature are to be used, best results are obtained when they are ground, either preliminarily or in the course of the process, more finely than has been the general practice, when they are used in making Portland cement according to the high temperature process.

It is to be understood that the relative proportions of the siliceous or argillaceous material and limestone passed through the kiln may be varied over a wide range. For example, sufficient siliceous or argillaceous material may be passed through the kiln with the limestone to produce a resulting mixture of cement mix proportions. This procedure would be desirable in case a crystalline siliceous material or other relatively inert siliceous, silico-argillaceous or other argillaceous material were used and consequently it should prove desirable to effect a breaking down of the crystalline structure or otherwise increase the reactivity of such material. When the siliceous or argillaceous material employed happens to be available in coarsely granular or lump form, it may, according to this embodiment of the invention, be introduced either in whole or in part in lump form into the kiln and then ground together with the lime in the subsequent grinding step, thus eliminating a separate grinding operation, except for any minor portion that is to be pre-ground for admixture with, or while admixed with, the limestone fines.

According to another embodiment of the invention, any desired portion of the siliceous or argillaceous material may be added to the products of the combined calcination step either intermediate the kiln and hammer mill or with the ground material coming from the hammer mill and introduced to the hydrator, or with the products of the hydration as they are introduced to the tube mill or other grinding or mixing means employed for effecting the final combinations according to the process of the aforesaid patent. On the other hand, an excess of siliceous and/or argillaceous materials may be present in the calcination kiln, in which case additional lime should be added either in the hammer mill or in the hydrator.

While it is recommended for best results that the hydration step be carried out separately from the final grinding and reaction stage in the tube mill, it is to be understood that the hydration may be effected in the tube mill in conjunction with the final grinding and mixing operations. In this latter case the operation should be so conducted that there shall be a substantial interval after the hydration of the lime has been completed during which the lime and siliceous or argillaceous materials are being ground at the controlled moderately elevated temperature, e. g., 100–400° C., in the presence of a limited amount of water.

In making the Portland cement addition, it is important to bear in mind that such addition when made in the form of finely ground cement must be made at a point subsequent to the hydrating step if a product having the setting and other desirable properties of a Portland or super cement is to be obtained. Otherwise the setting properties of the product will be destroyed in the hydrating stage. Therefore, if fine Portland cement, as distinguished from clinker, is to be used as an addition, this preferably should be added to the materials as they are introduced to the tube mill. It may, however, be added with advantage after the materials have passed from the tube mill.

When the Portland cement addition is made in the form of clinker, such clinker may be ground with the other materials in the hammer mill provided that the grinding is so controlled as to leave the clinker in a relatively coarse state, say, ground only to the point where all of the clinker will pass an 8-mesh sieve. In other words, the grinding should be stopped short of the point at which free hydration and setting of the components of the clinker addition will take place in the subsequent hydrating treatment with water. Alternatively, the clinker may be ground separately to around minus 8-mesh size and then added either with the other materials introduced to the hydrator or with the products of hydration in the tube mill. Irrespective of whether or not a Portland cement addition is made, it is advisable from the standpoint of preserving the setting properties of the final product to control the grinding of the materials coming from the calcination step so that the hydration and setting reactions characteristic in the normal use of the final product are not effected during the lime hydration step in those portions of the products of the calcination step that may have entered into chemical combination.

The calcination step is ordinarily carried out at lime burning temperatures as hereinbefore stated. However, the use of higher temperatures is not precluded and is desirable when using certain types of siliceous and/or argillaceous materials, provided precautions are taken to insure against vitrification of the siliceous and/or argillaceous material and other undesired consequences of the higher temperature. However, for economic reasons it will generally be advantageous to carry out the calcination step at lime-burning temperatures.

With a view to effecting still further improvement in the properties of the products of the present invention, we may use certain accelerating or improving agents having for their objects increase of the strength and speeding up of the setting of the cementitious products obtained. Agents of this type that have been found to improve our products in the respects indicated are ordinary salt, calcium chloride, sodium hydroxide, and tannic acid. The use of these agents in the general type of process disclosed in Patent No. 1,912,883 is more particularly claimed in the U. S. patent of Alton J. Blank, No. 1,953,924, dated April 10, 1934. The methods of incorporating the accelerating agents into the product and the percentage additions of such agents indicated therein as suitable have been found to be similarly effective in improving the products of the present process. That is to say, we have found that the introduction of small percentages of such additions either in the mixing water used in the preliminary hydration or directly into the tube mill and the incorporation of such additions with the mixture under the temperature and moisture conditions hereinbefore specified is productive of a notable improvement in the early strength values and also decreases the setting times required. The percentage additions of the accelerating agents may be varied somewhat and will vary with the particular agent. With sodium chloride a 1% solution used as the mixing water for hydration has been found to give satisfactory results. With sodium hydroxide and with calcium chloride a 2% solution is recommended. With tannic acid better results are obtained with the use of a smaller percentage, say around 0.02% of the mixing water used.

It is also within the scope of the invention to add a suitable water-proofing agent at an intermediate stage in the operation, as for example in the hydrator or in the tube mill. Tests have shown that rosin up to approximately 2% by weight of the final product is effective in imparting water-proof properties. Other resins or organic materials capable of forming resinates with the lime component of the mixture may be used.

In the foregoing description we have referred to certain chemical combinations as taking place between the lime and the siliceous, or siliceous and aluminous, components in the calcination step and in the later hydrating and grinding and mixing steps. We are not prepared to say definitely what particular combinations are effected. It seems safe to say that more or less complete combination is effected between the aluminous component and the lime in the calcination step, at least to the di-aluminate stage and possibly partially or completely to the tri-aluminate stage. At the same time, we believe that a certain amount or degree of combination is effected between the lime and the siliceous components. From solubility tests conducted on the finished material, it is not clear that the final product is completely converted to a mixture of di- and tri-calcium aluminates and silicates but this state seems to have been produced to a substantial extent. But irrespective of the precise nature of the reactions that are brought about, it is observed that when the final product is gaged with mixing water and used in the same manner as ordinary Portland cement, it appears to go through the hydrating and setting reactions characteristic of Portland cement; and, in view of the increased early strength and improved setting properties it would appear that the material in the course of the process has in some way been brought into a state which renders it more amenable to the chemical combinations that are requisite for a satisfactory hydraulic cement product.

It is to be understood that the phrase "mixture of siliceous and lime carbonate-containing materials" where used in the claims is to be construed as including both naturally occurring mixtures, for example, cement rocks and siliceous limestones, and mixtures compounded from siliceous materials and limestone or other lime carbonate-containing material. The word "siliceous" as used in the claims is to be understood as including siliceous sands, siliceous earths and clays, and other argillaceous materials generally known to be suitable as raw materials for supplying the siliceous and aluminous components in Portland cement and other hydraulic cement manufacture.

It is to be understood that the present disclosure is for the purpose of illustration only, and that the invention includes all the modifications and equivalents which fall within the scope of the appended claims.

We claim:

1. The process of producing cement which comprises burning an intimate mixture of siliceous and lime carbonate-containing materials at a temperature sufficient to calcine the carbonates but insufficient to cause clinkering, hydrating the free lime component of the resulting mixture and grinding said mixture in the presence of a small amount of water while maintaining a temperature of at least about 100° C. to promote combinations of the lime and siliceous components thereof, said grinding treatment being continued to produce a substantially dry, finely-divided product capable of hardening when water is subsequently added thereto.

2. The process of producing cement which comprises burning an intimate mixture of siliceous and lime carbonate-containing materials at a temperature sufficient to calcine the limestone but insufficient to cause clinkering, hydrating the free lime component of the resulting mixture, and thereafter grinding said mixture in the presence of a small amount of water while maintaining a temperature of at least about 100° C. to promote combinations of lime and siliceous components thereof, said grinding treatment being continued to produce a substantially dry, finely-divided product capable of hardening when water is subsequently added thereto.

3. The process of producing cement which comprises burning an intimate mixture of siliceous and lime carbonate-containing materials at a temperature sufficient to calcine the limestone but insufficient to cause clinkering, fine grinding the mixture and hydrating the free lime component thereof, thereafter mixing the product so produced in the presence of a small amount of water while maintaining a temperature of at least about 100° C. to promote combinations of the lime and siliceous components thereof, said grinding treatment being continued to produce a substantially dry, finely-divided product capable of hardening when water is subsequently added thereto.

4. The process of producing cement which comprises burning an intimate mixture of siliceous and lime carbonate-containing materials at a temperature sufficient to calcine the limestone but insufficient to cause clinkering, hydrating the free lime component of the resulting mixture and grinding said mixture with Portland cement clinker in the presence of a small amount of water while maintaining a temperature of at least about 100° C. to promote combinations of the lime and siliceous components present, said grinding treatment being continued to produce a substantially dry, finely-divided product capable of hardening when water is subsequently added thereto.

5. The process of producing cement which comprises burning an intimate mixture of siliceous and lime carbonate-containing materials of cement-making proportions at a temperature sufficient to calcine the limestone but insufficient to cause clinkering, hydrating the free lime component of the resulting mixture, and thereafter grinding the said mixture with Portland cement in the presence of a small amount of water while maintaining a temperature of at least about 100° C. to promote combinations of the lime and siliceous components present, said grinding treatment being continued to produce a substantially dry, finely-divided product capable of hardening when water is subsequently added thereto.

6. A substantially dry, finely-divided hydraulic cement, capable of hardening when water is subsequently added thereto, produced by burning an intimate mixture of siliceous and lime carbonate-containing materials at a temperature sufficient to calcine the limestone but insufficient to cause clinkering, hydrating the free lime component of the resulting mixture and grinding said mixture with Portland cement clinker in the presence of a small amount of water while maintaining a temperature of at least about 100° C. to promote combinations of the lime and siliceous components present.

JOHN A. BLANK.
ALTON J. BLANK.

CERTIFICATE OF CORRECTION.

Patent No. 2,125,281.                                            August 2, 1938.

JOHN A. BLANK, ET AL.

It is hereby certified that error appears in the printed specification of the above numbered patent requiring correction as follows: Page 2, first column, line 62, after "obtainable" insert the word when; page 3, first column, line 17, for "on" read or; and second column, line 10, for the patent number "1,912,882" read 1,912,883; and that the said Letters Patent should be read with this correction therein that the same may conform to the record of the case in the Patent Office.

Signed and sealed this 30th day of August, A. D. 1938.

Henry Van Arsdale (Seal)

Acting Commissioner of Patents.